Oct. 28, 1947.    H. KETEL    2,429,761
PINTLE HOOK
Filed June 17, 1946    2 Sheets-Sheet 1

INVENTOR
HENRY KETEL
BY Liverance and
Van Antwerp
ATTORNEYS

Oct. 28, 1947.     H. KETEL     2,429,761
PINTLE HOOK
Filed June 17, 1946     2 Sheets-Sheet 2

INVENTOR
HENRY KETEL
By Liverance and
Van Antwerp
ATTORNEYS

Patented Oct. 28, 1947

2,429,761

UNITED STATES PATENT OFFICE 2,429,761

PINTLE HOOK

Henry Ketel, Holland, Mich.

Application June 17, 1946, Serial No. 677,276

3 Claims. (Cl. 280—33.15)

1

This invention relates to a novel hitch by means of which a tractor and trailer may be coupled, or more generally any pulling vehicle may be detachably connected with a trailer or other moving implement to be pulled.

It is a primary object and purpose of the present invention to produce a very effective, strong, durable and efficient structure of the type noted, which is readily manufactured at low cost, the parts being produced largely from castings and requiring a minimum of machining for the fitting and assembly thereof.

An understanding of the invention, and of a preferred structure embodying the same may be had from the following description, taken in connection with the accompanying drawings, in which, Fig. 1 is a central vertical section from front to rear of the hitch structure of my invention, the parts being in the position when disconnected.

Like reference characters refer to like parts in the different figures of the drawings.

Figure 1:
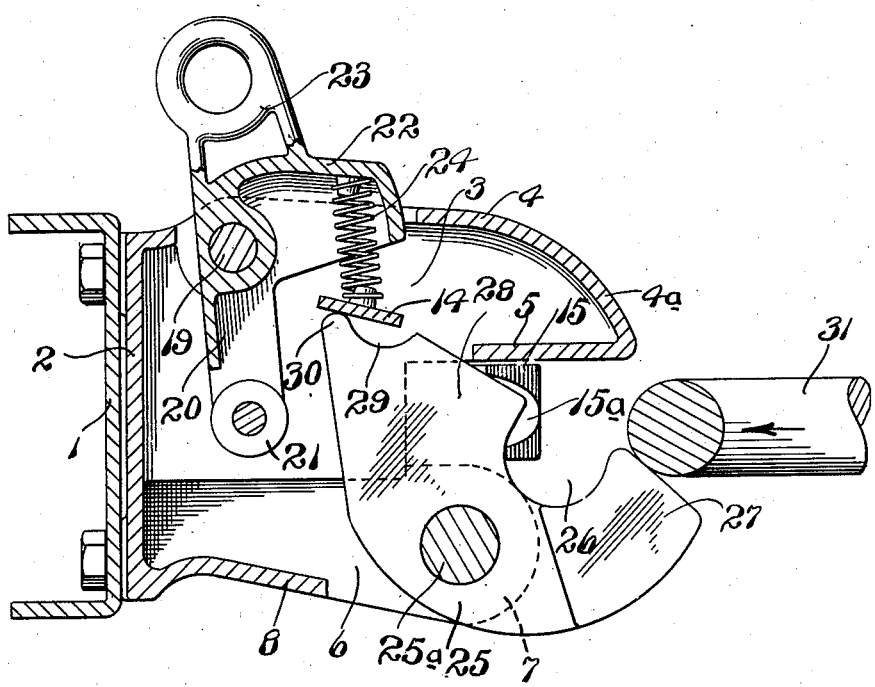
Figure 2:
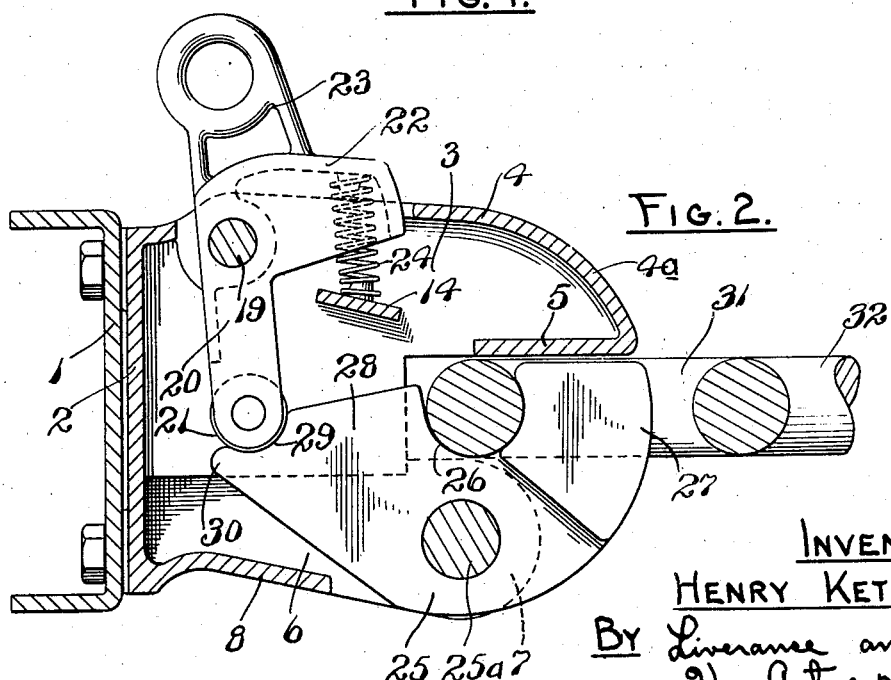
Fig. 2 is a similar section with the hitch in its operative connected position.

The hitch and novel hook construction of my invention is designed for securing, by bolts or the like, at the rear side of a tractor frame or draw bar 1 which may be of channel form, the structure of my invention being secured against the rear side of its vertical web as shown in Figs. 1 and 2.

In the construction of the device, a cast housing is provided, having a vertical back 2 of substantially square outline, through the corners of which the bolts for connection to the bar 1 are passed. Substantially midway between the vertical sides of the plate 2 spaced rearwardly extending housing sides 3 are cast integral with the plate and are integrally connected by top 4 which, at its free rear portion, curves downwardly and to the rear as at 4a, and terminates in an under horizontal section 5 which extends between and is integral with the sides 3 previously described. Said sides 3 at the horizontal section 5 and for a short distance inwardly therefrom are narrowed in height, back of which they are continued downwardly in spaced vertical sections 6 which, at their lower rear portions are thickened and formed into spaced relatively heavy ears 7, there being a horizontal opening above said ears 7 and below the section 5 into which the eye of a part secured to the trailer or other implement to be pulled is

2 adapted to be received. Said housing at its under side, below the edges of the section 6, has an integral bottom side 8 which extends from the lower edge of the back plate 2 and is cast therewith.

Figure 3:
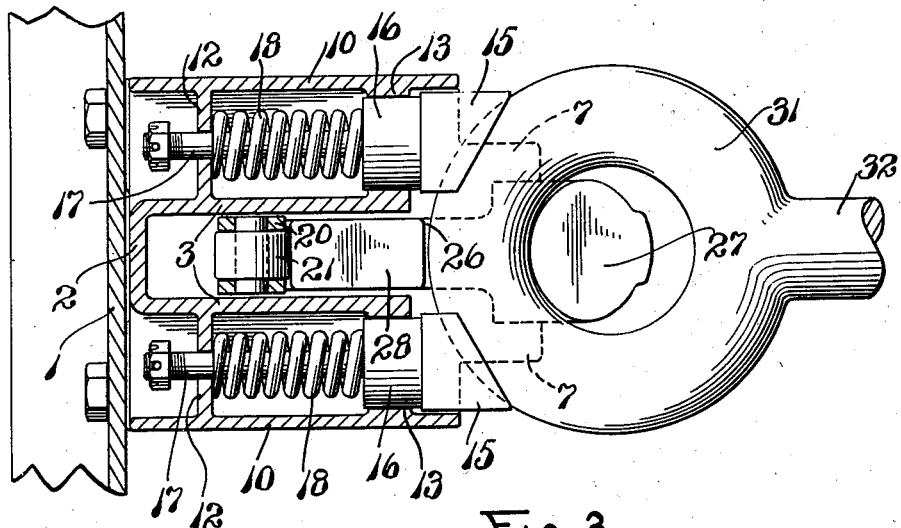
Fig. 3 is a horizontal section through Fig. 2 at a plane above the hook member.
Figure 4:
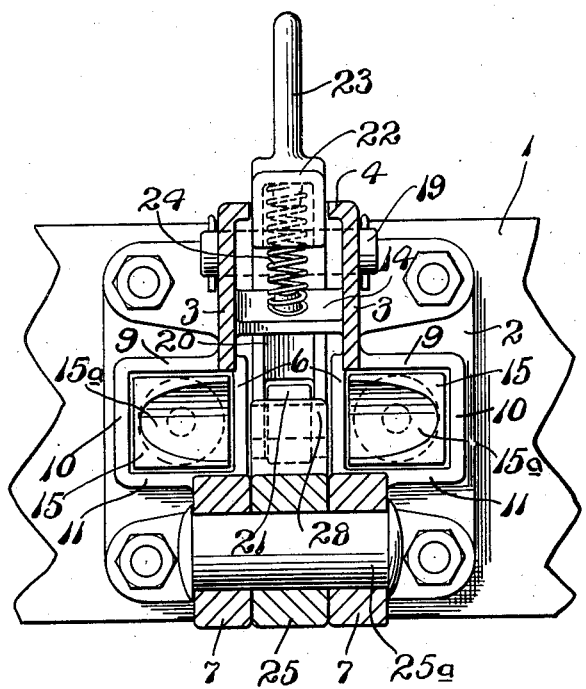
Fig. 4 is a transverse vertical section.

As the outer side of each of the vertical side sections 6, horizontal rectangular auxiliary housings are provided each having a top 9, a vertical outer side 10, paralleling the inner side 6, and a bottom 11 as shown in Figs. 3 and 4. A transverse web 12 extends across the interior of each auxiliary housing a short distance back of the plate 2 and spaced therefrom. A distance back of the webs 12 guides 13 are provided, said webs and guides serving to mount spring actuated retaining members. A cross bar 14 extends between the sides 3 at the place shown.

Each of said retaining members has a head 15 with a beveled outer end in which a concave recess 15a, as shown, is made. From the head a short cylindrical section 16 extends through its guide 13. A rod 17 is secured to each of said cylinder sections 16 and extends through its associated web 12 and has a nut threaded on to it at its free end. Between each web and the cylinder part 16 and located around each rod 17 a heavy coiled compression spring 18 is mounted (Fig. 3), the normal effect of which is to move the heads 15 rearwardly until stopped by said nuts on the rod 17 engaging webs 12.

The top cover 4 of the housing previously described, at its forward portion is cut away to provide an opening slightly below which and toward the front of the opening a horizontal pin 19 is located between and extending through the sides 3 (Fig. 4). On it a lever is mounted, having a downwardly extending arm 20 at the lower end of which a roller 21 is carried. Said lever is provided with a rearwardly extending arm 22 cored out at its under side and located in the opening in the top 4, between which and the cross bar 14 a lighter coiled compression spring 24 is disposed, the operation of which tends to turn said lever in a counter-clockwise direction. The lever has an upper arm 23 provided with an eye at its upper end and extends opposite the arm 20, for manual operation of the lever.

A hook member 25 is mounted for pivotal or rocking movement between its ends on a heavy pin 25a extending through and between the ears 7. In its upper side a recess 26 is provided having an outline substantially the arc of a circle somewhat greater than half a circle, and dividing the hook into rear and front portions 27 and 28 as best shown in Figs. 1 and 2. In the upper edge of the part 28 and near its end, a concave recess 29 is made shaped to receive the roller 21, the front upper portion of the part 28 adjacent said recess 29 having a short finger 30 with a rounded free end.

When the hook 25 is in its inoperative position, as in Fig. 1, an eye 31 formed at the forward end of a rod 32, which is connected with a trailer or other drawn vehicle or implement, may pass over the upper end of the part 27 to the recess at 26, and as in such position the end of the part 27 is rearwardly and downwardly inclined (Fig. 1) the eye 31, being circular in cross section, will ride over the rear end of the hook to said recess; and coming against the front side of the recess will turn it in a counter-clockwise direction. On such turning the front edge of the part 28 will ride against the roller 21 compressing spring 24 until the finger at 30 passes by said roller 21, and it is received in the recess 29 for the roller, as in Fig. 2. The sides of the circular eye 31 will seat in the concave recesses 15a of the heads 15, springs 18 being compressed and acting, after roller 21 is seated in recess 29, to force said eye 31 so that it will bear tightly against the rear side of the recess or opening 26 in which the eye is received. Such automatic connection is normally performed by backing the tractor to the trailer which is to be drawn, and the connection is automatic in the movement of the hook member 25 from its open releasing position in Fig. 1 to its connecting position in Fig. 2.

In connected position, shown in Fig. 2, the hook member 25 at its front end is forced with a relatively heavy pressure against the roller 21, due to the compressed springs 18, and a certain and sure connection of the hitch structure in such position is attained. The pull required when the tractor is pulling the trailer further helps and is an addition to the effect of the springs 18 instead of an opposition thereof.

To release the disconnected position, the arm 23 is turned in a clockwise position, thereby riding the roller 21 over the finger 30 and removing it out of the path of movement of the hook member 25, which may turn in a clockwise direction or until the finger 30 is stopped against the under side of the cross bar 14. The hook member 25 is of a heavy and strong construction to withstand the service to which it is subjected and in its engagement with the eye 31 (Fig. 2) it extends above the center of the cross section of the eye 31, making a positive and wholly operative and very effective and secure connection of the eye 31 with the hook. The eye 31 of course rides against the under side of the housing part 5 in its passage to and from its operative connection position shown in Fig. 2.

The construction described is readily manufactured and its parts assembled at low cost. The major portion of the structure consists of cast parts and substantially the only machining is with the pins 19 and 25a and their mountings, and in connection with the roller 21 and its pintle about which it turns. Economy in manufacture is thus attained.

The invention is defined in the appended claims and is to be considered comprehensive of all forms of structure coming within their scope.

I claim:

1. In a construction as described, a housing having spaced apart sides and a top, said housing being provided at its outer free end with a recess for the insertiton of a member to be coupled therewith, and said housing, at the outer sides of the spaced apart sides thereof, having auxiliary housings of which said spaced sides of the housing form parts, a hook recessed between its ends, at its upper side mounted for rocking movement, between its ends, at the lower outer portion of said housing between the sides thereof, a lever pivotally mounted at the upper inner portion of said housing between the sides thereof, having a downwardly extending arm adapted to engage with the upper side of said hook to hold it in operative position, spring means acting upon said lever to normally turn it in the direction of said hook to engage therewith, said arm having a roller at its lower end and said hook having a recess at the upper side of its inner portion to receive the roller, and said hook at its inner end having an edge to bear against said roller to turn it against the force of said spring means until the roller passes to the upper side of the inner portion of said hook which is received in said recess, engaging members having outer heads and rods extending inwardly therefrom lengthwise of the auxiliary housings mounted for longitudinal movement therein, and other spring means tending to force said heads outwardly, each of said heads at its outer end having a recess, whereby a coupling eye received in the recess in the upper side of said hook, is seated in said recesses of the heads and said other spring means is compressed in such engagement.

2. In a structure as described, a hollow housing having spaced vertical sides connected at their inner ends and open at their outer ends, a hook pivotally mounted between its ends at the lower outer portions of and disposed between the sides of said housing, said hook having a coupling recess in its upper side between its ends of a form to receive a coupling eye of circular shape and circular in cross section, said sides of the housing, at their upper edges, having an integral cover extending outwardly and downwardly and terminating in a horizontal inwardly extending section located above the outer portion of said hook, a lever pivoted between the sides of the housing at the upper inner portions thereof, said lever having a downwardly extending arm, a roller at the lower end of the arm adapted to engage with the inner portion of said hook at its upper side to hold the hook with its outer end portion in close proximity to said inwardly extending section of the cover, said lever having an outwardly extending second arm, and the cover having an opening in which said arm is located, a compression spring having its upper end bearing against the under side of said arm, said housing having a transverse bar between its sides against which the lower of the spring bears, said lever having a third arm extending upwardly adapted for manual operation to disengage the first arm of said lever from said hook, and sliding engaging members mounted on said housing, one at each side of the hook, each provided with a recess, to engage against the outer sides of the coupling member at spaced apart points, combined with an additional yielding spring means for normally forcing said engaging members outwardly to press against the eye of the coupling member and hold it against the hook.

3. In a structure as described, a hollow housing having spaced vertical sides connected at their inner ends and open at their outer ends, a hook pivotally mounted between its ends at the lower outer portions of and disposed between the sides of the housing, said housing at the outer side of each of the sides thereof having an integrally formed auxiliary housing, said hook having a coupling receiving recess at its upper side between its ends, said sides of the housing at their upper edges having an integral cover extending outwardly and downwardly and terminating in a horizontal inwardly extending section located above the outer portion of said hook, a lever pivoted between the upper inner portions of the side of the housing having a downwardly extending arm, a roller at the lower end of the arm adapted to engage with the inner portion of the hook at its upper side to hold the hook with its outer end portion in close proximity to the inwardly extending section of the cover, said lever having an outwardly extending second arm, and the cover having an opening in which said arm is located, a compression spring having its upper end bearing against the side of said arm, said housing having a transverse bar between its sides against the lower end of which the spring bears, and said lever having a third arm extending upwardly adapted for manual operation to disengage the first arm of said lever from said hook, a head slidably mounted at the outer end of each of the auxiliary housings, a rod extending from each head inwardly lengthwise of its auxiliary housing, each of said auxiliary housings having a transverse partition through which its rod passes, additional coiled compression springs, one around each rod between each of said heads and partitions, and a nut screwed on the inner end of each of said rods, each of said heads at its outer end having a recess against which a coupling member adapted to engage with the hook and seat in the recess in the upper side thereof is brought into pressure engagement with the heads to compress the additional springs.

HENRY KETEL.

REFERENCES CITED

The following references are of record in the file of this patent:

UNITED STATES PATENTS

| Number | Name | Date |
| --- | --- | --- |
| 1,824,843 | Staley | Sept. 29, 1931 |
| 2,397,558 | Mennen | Apr. 2, 1946 |